United States Patent Office 3,629,113
Patented Dec. 21, 1971

3,629,113
LUBRICATING COMPOSITION
Robert A. Gerlicher, Baton Rouge, La., assignor to Copolymer Rubber & Chemical Corporation, Baton Rouge, La.
No Drawing. Filed Apr. 24, 1969, Ser. No. 819,120
Int. Cl. C10m 1/18, 1/22
U.S. Cl. 252—49.7          6 Claims

ABSTRACT OF THE DISCLOSURE

A lubricant to prevent fouling of equipment contacted by polymerizable ethylenically unsaturated hydrocarbons and/or ethylenically unsaturated esters in which the lubricating composition contains a soluble N-nitroso aryl hydroxyl amine and preferably an oil soluble salt thereof.

---

This invention relates to a lubricant which may be used to prevent fouling of surfaces and equipment contacted by polymerizable ethylenically unsaturated hydrocarbons and/or ethylenically unsaturated esters.

This invention is concerned with the preparation of monoolefinic and polyolefinic homopolymers and copolymers such as the polymerization of olefins, preferably alpha olefins, containing from 2–20 and preferably 2–8 carbon atoms, and aromatic hydrocarbons having one or more side chains with ethylenic unsaturation and preferably containing from 2–8 carbon atoms. Representative are polymers and copolymers formed of conjugated diolefins preferably having from 4–6 carbon atoms, such as butadiene, isoprene, piperylene, ethlenically unsaturated hydrocarbons such as styrene, vinyl naphthalene, divinyl benzene, vinyl pyridine, acrylic acids and esters, amides and nitriles thereof such as alkylacrylates, methylmethacrylate, ethylene dimethacrylate and allyl maleate, acrylonitriles, methylvinyl ketone, and copolymers thereof such as butadiene-styrene, butadiene-acrylonitriles or butadiene-styrene-vinylpyridine terpolymer.

In the preparation of monoolefinic and polyolefinic monomers or homopolymers and copolymers thereof by polymerization of ethylenically unsaturated hydrocarbons and/or ethylenically unsaturated esters, etc., it has been found that various pieces of equipment contacted by the monomeric materials or the materials undergoing polymerization are subject to inactivation during operation of the process thereby to require frequent interruption of the operation, frequent replacement of parts, and are also subject to excessive wear and clogging with corresponding lack of control of the polymerization process and corresponding waste on product or production of inferior product.

For example, excessive fouling of the compressors and vacuum pumps is experienced in units handling vapors containing styrene and/or butadiene monomers in the manufacturing plant or in the rubber plant recovery area as well as in the butadiene plant compressors, such as reciprocating piston pumps, rotary screw pumps, centrifugal compressors, or water seal systems for water seal vacuum pumps or compressors. It is believed that the heat of compression permits polymerization or copolymerization whereby solid polymer or copolymer is formed to cause polymer fouling of the equipment.

Somewhat the same difficulties have been experienced with other moving parts in contact with the monomers whereby polymer accumulates on the surfaces of the moving parts to cause gumming of the equipment and interference with the proper operation thereof. When this occurs, it is necessary to interrupt the operation and to either clean the equipment or replace the equipment, which operation is both time-consuming and expensive.

Similarly, polymer and copolymer forms in various of the valves through which the monomers are processed as well as lines through which they flow to cause undesirable plugging thereof. Such conditions are particularly dangerous with respect to plug cocks, safety valves and lines leading therefrom since it is essential for such elements to remain open or easily operated for proper control of the polymerization process and for plant safety reasons.

It is an object of this invention to provide a process which may be used in the polymerization or copolymerization of ethylenically unsaturated hydrocarbons and/or ethylenically unsaturated esters and to provide a new and improved lubricating composition which may be used in the practice of same whereby the fouling or clogging of equipment, moving parts, valves, stop cocks, and lines contacted by such monomers during the polymerization process, can be greatly minimized if not substantially completely eliminated.

It has been found, in accordance with the practice of this invention, that when such parts are lubricated with or treated with or contacted with a lubricating composition formulated of an oleaginous material containing, in solution, an N-nitroso aryl hydroxyl amine and preferably an oil soluble salt thereof, the parts or surfaces remain relatively free of accumulation of polymer or copolymer thereby to keep the elements free of polymer fouling or plugging. It has been found that the formulation of the lubricating composition to contain the dissolved N-nitroso aryl hydroxyl amine salt not only functions to prevent accumulation of polymer on the surface or part but that such composition also enjoys improved lubricating characteristics.

Representative of the oleaginous materials which may be used as the base for the lubricating composition are conventional lubricating oils of petroleum or paraffin base or fluorosilicone fluids which are generally used in the lubricating art.

Representative of the oleaginous soluble salts of the N-nitroso aryl hydroxyl amines are the titanium, vanadium, tin and preferably iron salts of the N-nitroso aryl hydroxyl amines, as represented by N-nitroso phenyl hydroxyl amine, N-nitroso naphthyl hydroxyl amine, N-nitroso chlorophenyl hydroxyl amine, and N-nitroso bromophenyl hydroxyl amine.

It is sufficient if the nitroso aryl hydroxyl amine or its soluble salt is present in the lubricating composition in the ratio of 1 part by weight per 10,000 parts by weight of oleaginous material and preferably when present in the ratio of 1 part by weight per 100 to 400 parts by weight of the oleaginous material. The nitroso aryl hydroxyl amine or salt can be added directly to the oleaginous material for solution therein, but it is preferred to dissolve the salt first in a hydrocarbon solvent, such as acetone, methyl ethyl ketone, ethyl benzene, methyl isobutyl ketone, benzene, naphthalene and the like, to form a dilute solution which can be be blended with the oil to provide a new and improved lubricating composition. For this purpose, the salt can be dissolved in the hydrocarbon solvent in an amount to form a 0.1% to 10% solution which can then be blended with the oil to provide the desired ratio to lubricant.

The following examples are given by way of illustration, but not by way of limitation:

EXAMPLE 1

50 grams of the iron salt of N-nitroso phenyl hydroxyl amine
2 gallons benzene
2 gallons lubricating oil (petroleum)

EXAMPLE 2

50 grams of the tin salt of N-nitroso naphthyl hydroxyl amine 4 gallons lubricating oil (a naphthenic oil of 20.3% aromatics, 79.3% saturates and 0.4% polar compounds)

In the foregoing Example 1, the iron salt of the N-nitroso phenyl hydroxyl amine can be replaced by equivalent amounts of oil soluble tin, titanium, vanadium, molybdenum and the salts of N-nitroso aryl hydroxyl amine in which the aryl group is phenyl, naphthyl, chlorophenyl, bromophenyl and the like.

In Example 1, the salt is first dissolved in the benzene and the benzene solution is blended into the lubricating oil. In Example 2, the salt is dissolved directly in the lubricating oil.

In use, as in an SBR plant, monomer recovery section, the lubricant of Examples 1 or 2 is fed at a rate of two drops per minute by a McCord lubricator driven by a reciprocating compressor to the compressor suction plug valve bottom core at the compressor station. The life of the plug cock is increased almost three-fold over the life of plug cocks operating in the same location and lubricated with the usual type plug cock greases. Further, the plug cock can be easily opened and closed without the need for special equipment and without the otherwise ever-present danger of breakage.

The lubricant composition of Example 1 is added dropwise at a rate of about two drops per minute to the compressor rod packing and to the section line to the compressor to lubricate the piston and cylinder of the compressor pumps operating on the styrene or butadiene monomers at the compressor station in the recovery section. As a result, the piston rings remain relatively free of fouling or polymer accumulation in grooves and the operating efficiency is greatly increased over that which is achieved in the use of lubricants of conventional composition. The lubricating composition also seems to ease the removal of the suction and discharge valves to enable removal in shorter time, with little, if any, breakage. Also, piston and cylinder wall scoring is reduced to enhance the life of both of these parts of the compressor with corresponding improvement in efficiency.

Similarly, unexpected improvements have been experienced in the use of the lubricating compositions of Examples 1 and 2 in the elimination of plugging of valves which are contacted by the monomers, such as safety valves on the discharge line. Two drops per minute of the composition of Example 1 to the safety valve inlet and discharge line has eliminated plugging. Lubrication with the composition of this invention operates to keep the valves and the lines open so as to enable greater reliance on valve controls.

In the practice of this invention it is desirable to make use of applicators for the lubricating compositions which are free of rubber or neoprene in parts which come in contact with the lubricating composition.

It will be apparent from the foregoing that I have provided a new and improved lubricating composition which greatly inhibits the polymerization of monomers and comonomers, as represented by the polymerization of ethylenically unsaturated hydrocarbons and/or ethylenically unsaturated esters by free radical type catalysts such as described in U.S. Patents No. 3,247,146 and No. 3,130,171, which are incorporated herein by reference.

While the invention has been described with reference to the protection of equipment in monomer polymerization plants, it will be understood that the lubricating compositions and methods of this invention will have application to inhibit polymerization of monomers in equipment in which such polymerizable monomers are being manufactured.

It will be further understood that changes may be made in the details of formulation and operation without departing from the spirit of the invention, especially as defined in the following claims.

I claim:

1. A lubricating composition for preventing fouling of equipment contacted by polymerizable unsaturated monomers comprising an oleaginous lubricating liquid and an oil soluble compound in the form of an N-nitroso aryl hydroxyl amine or salt thereof of a metal selected from the group consisting of iron, titanium, vanadium, tin and molybdenum and dissolved in the oleaginous liquid in the ratio of 1 part by weight to 100 to 10,000 parts by weight of the oleaginous material.

2. A lubricating composition for preventing fouling of equipment contacted by monomers in the polymerization of ethylenically unsaturated monomers or esters comprising an oleaginous lubricating liquid and an oil soluble compound in the form of an N-nitroso aryl hydroxyl amine or salt thereof of a metal selected from the group consisting of iron, titanium, vanadium, tin and molybdenum and dissolved in the oleaginous liquid in the ratio of 1 part by weight to 100 to 400 parts by weight of the oleaginous liquid.

3. A lubricating composition as claimed in claim 1 in which the dissolved compound is the iron salt of N-nitroso phenyl hydroxyl amine.

4. A lubricating composition as claimed in claim 1 which includes a solvent in which the N-nitroso aryl hydroxyl amine compound or salt is dissolved and blended with the oleaginous liquid.

5. A lubricating composition as claimed in claim 4 in which the solvent is selected from the group consisting of benzene and naphthalene.

6. A lubricating composition as claimed in claim 5 in which the compound is dissolved in the solvent in an amount to provide a 0.1% to 10% by weight solution.

References Cited

UNITED STATES PATENTS

| | | | |
|---|---|---|---|
| 2,178,455 | 10/1939 | Musselman | 252—51.5 X |
| 2,189,788 | 2/1940 | Freeman | 252—51.5 X |
| 2,326,938 | 8/1943 | Fuller et al. | 252—51.5 X |
| 2,383,189 | 8/1945 | Hancock | 260—695 X |
| 2,411,593 | 11/1946 | Routson | 252—51.5 X |
| 2,486,441 | 11/1949 | Seger et al. | 260—695 X |
| 2,514,017 | 7/1950 | Wachter et al. | 252—51.5 |

DANIEL E. WYMAN, Primary Examiner

W. J. SHINE, Assistant Examiner

U.S. Cl. X.R.

252—51.5 R